United States Patent [19]

Cioffi et al.

[11] Patent Number: 5,104,735

[45] Date of Patent: Apr. 14, 1992

[54] FIRE RETARDANT COATING COMPOSITION

[75] Inventors: Eugene A. Cioffi, Niantic; Hamilton Hicks, Greenwich, both of Conn.

[73] Assignee: Hamilton Chemical Corporation, New York, N.Y.

[21] Appl. No.: 354,019

[22] Filed: May 8, 1989

Related U.S. Application Data

[63] Continuation-in-part of Ser. No. 244,560, Sep. 12, 1988, abandoned, which is a continuation of Ser. No. 130,414, Dec. 9, 1987, abandoned.

[51] Int. Cl.$^5$ ................................................ C08K 3/34
[52] U.S. Cl. ............................ 428/383; 174/110 AR; 174/120 AR; 174/121 A; 428/390; 524/432; 524/447; 524/492; 524/493; 524/532
[58] Field of Search .............. 524/432, 492, 493, 447, 524/552; 428/380, 383, 921, 463, 390, 382; 174/110 AR, 120 AR, 121 A

[56] References Cited

U.S. PATENT DOCUMENTS

| | | | |
|---|---|---|---|
| 2,093,501 | 9/1937 | Williams | 174/110 |
| 2,894,929 | 7/1959 | Newton et al. | 524/493 |
| 3,602,636 | 8/1971 | Evans | 174/110 AR |
| 3,784,499 | 1/1974 | Krupnick | 524/492 |
| 4,225,649 | 9/1980 | Peterson | 428/383 |
| 4,686,253 | 8/1987 | Struss et al. | 524/425 |

FOREIGN PATENT DOCUMENTS 533560  11/1956  Canada .

OTHER PUBLICATIONS

Bhatnager, V. M.: Fire Retardant Formulations Handbook, vol. 1, Progress in Fire Retardancy Series, p. 41 (1972).

*Primary Examiner*—Veronica P. Hoke
*Attorney, Agent, or Firm*—White & Case

[57] ABSTRACT

The claimed invention relates to a water-insoluble fire retardant coating composition and a method of rendering PVC cable fire resistant.

19 Claims, 1 Drawing Sheet

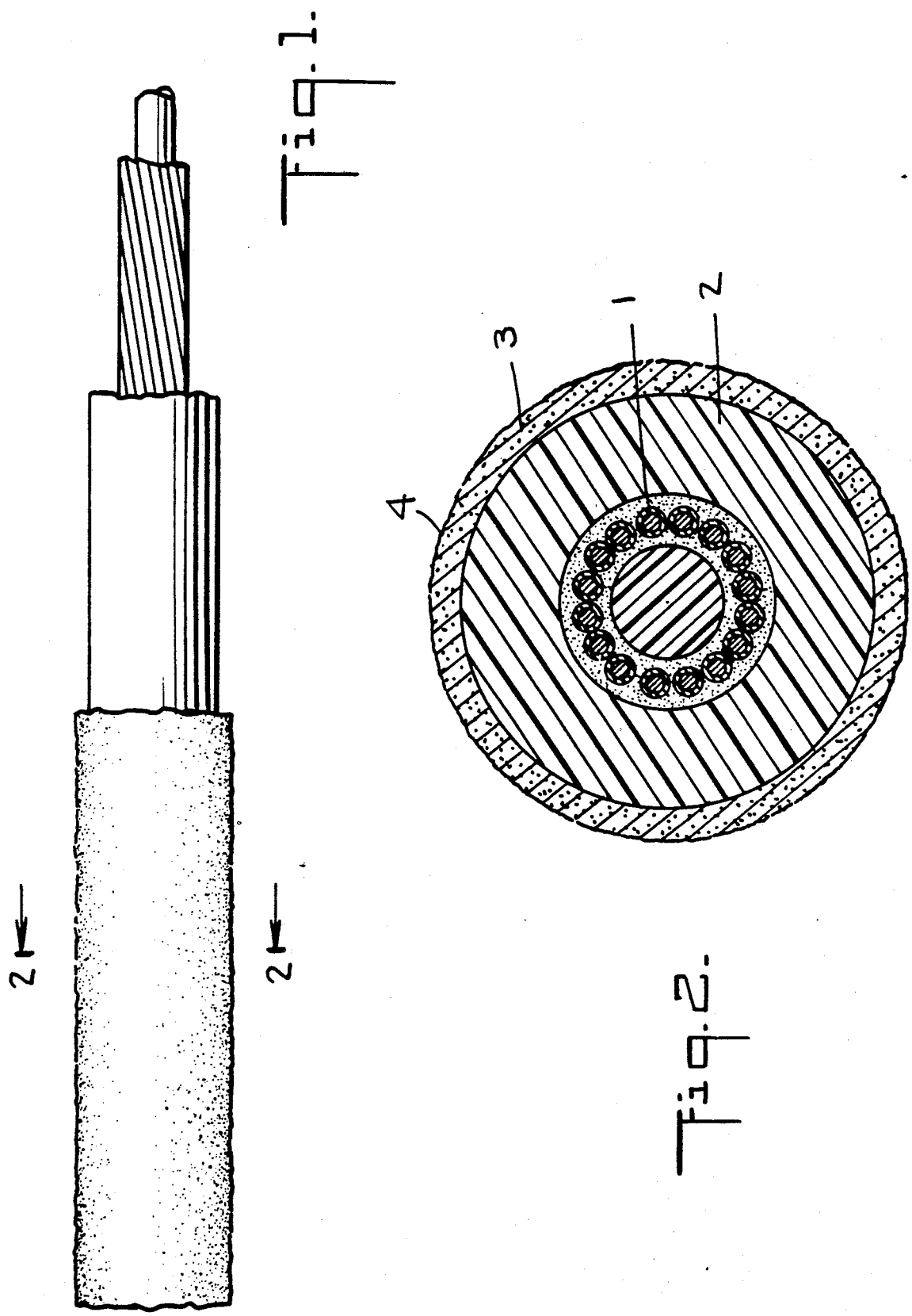

FIRE RETARDANT COATING COMPOSITION

BACKGROUND OF THE INVENTION

This application is a continuation-in-part of U.S. application Ser. No. 244,560 filed Sept. 12, 1988, which in turn is a continuation of U.S. application Ser. No. 130,414 filed Dec. 9, 1987, all now abandoned.

The present invention relates to a fire retardant coating composition for use on ignitable or flammable cables and the like in naval applications, as well as in the building, construction and transportation industries.

Most cables installed on naval ships use insulation and jacket materials made of polyvinylchloride ("PVC"). Cables using PVC can ignite easily, and when ignited they produce dense, acrid smoke, toxic and corrosive by-products, and volatile, dripping liquids that promote further combustion. Fires in grouped cables are difficult to extinguish, and spread rapidly throughout a ship. Fires involving PVC cables threaten serious injury to personnel, loss of requisite electrical power to ship systems, and may ultimately result in the complete loss of the ship itself.

Although fire-hardened cables have been developed for use in new ship construction, most existing ships were built without fire-hardened cables, and have jacketing materials that are a significant fire hazard. There are approximately 30 tons (250 miles) of cable in a frigate and over 120 tons (1000 miles) in an aircraft carrier. Running throughout a ship, such cable is exposed to numerous heat sources. Once ignited, the burning cable can spread fires rapidly to other parts of a ship.

Accordingly, the object of the present invention is to provide a water-insoluble coating for ignitable cable such as PVC for use in naval, building and construction applications which protects against thermal damage that causes such cable to soften, deform or ignite, yet will not significantly de-rate the electrical performance of said cables. This invention would also be useful in coating subway cables or cables in any confined space.

A further object of the present invention is to provide a coating for ignitable cable having a long storage capacity.

A further object of the present invention is to provide a coating for ignitable cable which has a variable viscosity, allowing it to be easily applied by painting, trowelling or spraying.

SUMMARY OF THE INVENTION

The claimed invention relates to a fire retardant coating composition comprising 71.3 to 81.5 percent by weight of a sodium silicate/latex blend and 18.5 to 28.7 percent by weight of a silica-containing powder.

The claimed invention also relates to a method of rendering ignitable cable, such as PVC cable, fire resistant, which comprises mixing a silica-containing powder into a sodium silicate/latex blend; and applying the mixture to the PVC cable, wherein the thickness of the mixture is controlled by the amount of silica-containing powder used.

BRIEF DESCRIPTION OF THE DRAWINGS

FIG. 1 is a side elevational view of an electrical conductor surrounded by PVC and the claimed fire retardant composition.

FIG. 2 is a cross-sectional view of FIG. 1.

DETAILED DESCRIPTION OF THE INVENTION

The claimed invention relates to a water-insoluble fire retardant coating composition comprising a sodium silicate/latex blend and a silica-containing powder and a method of rendering ignitable cables, preferably PVC cables, fire resistant.

The preferred fire retardant composition comprises a two part mixture having a liquid component and a solid component, although the composition can be prepared as a single mixture. The viscosity of the composition is controlled by varying the ratio of liquid component to solid component. In this manner, the composition may be made suitable for application to cables and the like by brushing, rolling, spraying or trowelling. Preferably, the solid component is added to the liquid component rather than vice-versa, and the composition is mixed slowly so as not to greatly aerate the composition.

The claimed composition may be applied in one or more coats to the surface of the cable or other material being made fire resistant. Preferably, at least two coats of the claimed composition are applied. When two coats are applied, the first coat is preferably thinner than the second coat. The total thickness of the claimed composition on the cable surface should be at least 0.3175 cm ($\frac{1}{8}$").

The claimed coating composition comprises about 71.3 to about 81.5 percent by weight of a sodium silicate/latex blend, which is the liquid component of the composition, and about 18.5 to about 28.7 percent by weight of a silica-containing powder, the solid component. When the composition is to be applied by brushing, rolling, or spraying, about 76.0 to about 81.5 percent by weight of the liquid latex blend is preferably used with about 18.5 to about 24.0 percent by weight of the powder. When the composition is to be applied by trowelling, the viscosity of the composition should be increased by using a greater proportion of powder. In that case, about 71.3 to about 75.0 percent by weight of the liquid latex preferably should be used with about 25.0 to about 28.7 percent by weight of the dry powder.

The sodium silicate/latex blend may comprise a mixture of about 52.0 to about 57.0 percent by weight of sodium silicate, about 6.4 to about 11.4 percent by weight of liquid, preferably water, and about 34.0 to about 39.0 percent by weight of latex. The sodium silicate may be any of the commercially available products containing typically 33–44% sodium silicate in water solution, one supplier of such being Philadelphia Quartz Co. The latex may be, for example, a neoprene latex, typically in the form of an emulsion in water, such as that commercially available from the Mobay Chemical Co. as chloroprene L345 containing 50% solids. Alternatively, a polydimethylsiloxane latex such as Silastic ® from Dow Chemical may also be used.

The silica-containing powder is blended into the latex material until the desired viscosity of the overall composition is achieved. The silica-containing powder may comprise perlite, fumed silica, or mixtures thereof. Preferably, 32 to 100 percent by weight perlite and 0 to 68 percent by weight fumed silica is employed. When the perlite is finely ground, the claimed composition provides a smooth coating. If roughly ground perlite is used, the coating formed by the claimed composition forms a rough surface, which may afford additional heat radiating value. Perlite may be obtained from Shundler Co. Fumed silica may be obtained from the Cabot Corp. under the name of Cabosil ®.

Other materials may be added to the fire retardant coating composition of the invention. For example, about 5.0 to about 16.4 percent by weight china clay may be added to further improve the fire retardant properties of the claimed composition. The clay may be obtained from Industrial Sales Mountains under the name of kaolin. Also, an additive selected from the group consisting of zinc oxide, titanium dioxide and mixtures thereof may also be incorporated into the claimed composition prior to application. Preferably, about 1.9 to about 9.0 percent by weight of zinc oxide and about 4.6 to about 13.5 by weight of titanium dioxide is used to enhance thermal stability. About 31.7 to about 38.1 percent by weight quartz or volcanic rock may also be added to the claimed composition to further increase the fire retardant properties of the claimed composition. Suitable quartz may be obtained from the Philadelphia Quartz Co.

The claimed composition can be blended and made ready for use on site without premature hardening.

In addition, up to an additional 12% by weight of liquid component may be added to the composition to control the viscosity. Once blended, the claimed composition should be stored at temperatures above 40° F.

When exposed to fire, the claimed composition advantageously forms a glass-like coating and does not ignite or fume. When heated by fire, the latex component of the composition chars, but the silicate component converts to a non-combustible, vitreous coating. The resultant fire-retardant jacket over the cable inhibits further burning and prevents re-ignition. The rigid non-permeable siliceous jacket formed by the claimed composition serves to prevent flow of molten cable material underneath it.

The following non-limiting examples serve to further illustrate the claimed invention.

EXAMPLE 1

A specific example of the claimed compound is as follows:

| Liquid Component: | |
| --- | --- |
| Sodium Silicate: | 1666.96 g |
| | (1230 mL) |
| Water: | 272.16 g |
| | (270 mL) |
| Latex: | 1116.50 g |
| | (980 mL) |
| Total | 3055.62 g |
| | (1 U.S. gallon) |
| Solid Component: | |
| Cabosil ®: | 101.50 g |
| Quartz: | 315.20 g |
| Kaolin: | 101.50 g |
| Perlite: | 182.70 g |
| Zinc Oxide: | 81.20 g |
| Titanium Dioxide: | 121.79 g |
| Total | 903.89 g |

EXAMPLE 2

Samples of the claimed fire retardant coating composition described in Example 1 was subjected to the following tests.

(A) Flame Spread

An ASTM 162 radiant panel test was run on three separate occasions using three different samples of the claimed composition as described in Example 1. A power cable such as those generally found on naval vessels was used. The flame spread results were as follows:
1. Class I rating with a flame spread index of 4.
2. Class I rating with a flame spread index of 3.
3. Class I rating with a flame spread index of 4.

(B) IEEE 383 Test

The claimed compound having the composition shown in Example 1 was coated on PVC cables, which were fixed on a vertical metal apparatus resembling a cable run. A flame was lit at the base of the apparatus and the material being tested was exposed to heat and flames for 15 minutes.

Using power cables generally found on naval vessels, the claimed compound passed the IEEE 383 test with no propagation.

(C) Corridor Flame Test

The claimed compound as described in Example 1 was coated on PVC cables, and the cables were fixed to a horizontal metal apparatus and elevated. The material was exposed to heat and flames from below the apparatus for 15 minutes.

The claimed composition passed the corridor flame test. No propagation along the cable run occurred when fully coated. No propagation passed the coated area when partially coated Power cables such as those generally found on naval vessels were employed.

(D) Impassity Test (Accelerated Service Test)

The impassity test was run over power cables such as those generally found on naval vessels. The coating did not appreciably de-rate the current carrying capacity of the cables.

We claim:

1. A coating composition suitable for protecting cable against performance derating caused by thermal damage comprising about 71.3 to about 81.5% by weight of a sodium silicate/latex blend said blend comprising a mixture of about 52.0 to about 57.0% by weight of sodium silicate, about 6.4 to about 11.4% by weight of water, and about 34.0 to about 39.0% by weight of neoprene or polydimethylsiloxane latex, and about 18.5 to about 28.7% by weight of silica-containing powder consisting essentially of either ground perlite, fumed silica or mixtures thereof.

2. The fire retardant coating composition according to claim 1, wherein the silica-containing powder comprises about 32.0 to 100 percent by weight perlite and 0 to about 68.0 percent by weight fumed silica.

3. The fire retardant coating composition according to claim 1 wherein the silica-containing powder further comprises about 5.0 to about 16.4 percent by weight of the powder of china clay.

4. The fire retardant coating composition according to claim 1, wherein the silica-containing powder further comprises an additive selected from the group consisting of zinc oxide, titanium dioxide and mixtures thereof.

5. The fire retardant coating composition according to claim 4, wherein the additive comprises about 1.9 to about 9.0 percent by weight zinc oxide and about 4.6 to about 13.5 percent by weight titanium dioxide.

6. The fire retardant coating composition according to claim 1, wherein the silica-containing powder further comprises a mineral selected from the group consisting of quartz and volcanic rock.

7. The fire retardant coating composition according to claim 1, further comprising up to about an additional 12% by weight of sodium silicate/latex blend.

8. The coating composition according to claim 1, wherein the non-toxic latex is selected from the group consisting of noeprene.

9. The fire retardant coating composition according to claim 1, wherein the silica-containing powder comprises a compound selected from the group consisting of ground perlite, fumed silica, and mixtures thereof.

10. A method of rendering cable resistant to performance derating caused by thermal damage, which comprises:

mixing about 18.5 to about 28.7% by weight of a silica-containing powder consisting essentially of either ground perlite, fumed silica or mixtures thereof into a sodium silicate latex blend comprising about 52.0 to about 57.0% by weight sodium silicate, about 34.0 to about 39.0% by weight of a neoprene or polydimethylsiloxane emulsion, and about 6.4 to 11.4% by weight water; and applying at least one layer of the mixture to the cable, wherein the thickness of the mixture is controlled by the amount of said silica-containing powder used.

11. The method according to claim 10, wherein two layers of mixture are applied to the cable and the first layer is thinner than the second layer.

12. The method according to claim 10, wherein about 71.3 to about 81.5 percent by weight of sodium silicate/latex blend and about 18.5 to about 28.7 percent by weight of silica-containing powder are mixed.

13. The method according to claim 10, wherein the silica-containing powder comprises a compound selected from the group consisting of ground perlite, fumed silica, and mixtures thereof.

14. The method according to claim 13, wherein the silica-containing powder comprises about 32.0 to 100 percent by weight perlite and 0 to about 68.0 percent by weight fumed silica.

15. The method according to claim 10, wherein the silica-containing powder contains about 5.0 to about 16.4 percent by weight of the powder of china clay.

16. The method according to claim 10, further comprising adding an additive selected from the group consisting of zinc oxide, titanium dioxide and mixtures thereof to the mixture.

17. The method according to claim 10, wherein the silica-containing powder includes a mineral selected from the group consisting of quartz and volcanic rock.

18. The method according to claim 10, wherein the cable is polyvinylchloride cable.

19. The method according to claim 10, wherein the latex emulsion is selected from the group consisting of neoprene.

* * * * *